United States Patent
Alperovich et al.

(10) Patent No.: US 6,600,738 B1
(45) Date of Patent: Jul. 29, 2003

(54) ROUTING IN AN IP NETWORK BASED ON CODEC AVAILABILITY AND SUBSCRIBER PREFERENCE

(75) Inventors: Vladimir Alperovich, Dallas, TX (US); Andreea Timberlake, Grapevine, TX (US)

(73) Assignee: Ericsson, Inc., Richardson, TX (US)

( * ) Notice: Subject to any disclaimer, the term of this patent is extended or adjusted under 35 U.S.C. 154(b) by 0 days.

(21) Appl. No.: 09/410,919

(22) Filed: Oct. 2, 1999

(51) Int. Cl.[7] ............................................. H04L 12/66
(52) U.S. Cl. ....................... 370/352; 370/353; 370/356; 370/401; 370/466; 370/238
(58) Field of Search .............................. 370/310, 310.2, 370/328, 332, 333, 352, 353, 354, 355, 356, 401, 400, 465, 466, 338, 389, 391, 395.3, 395.31, 395.32, 238; 375/222

(56) References Cited

U.S. PATENT DOCUMENTS

| | | | |
|---|---|---|---|
| 5,557,029 A | | 9/1996 | Lu et al. |
| 5,818,824 A | * | 10/1998 | Lu et al. ..................... 370/328 |
| 5,953,331 A | * | 9/1999 | Duncan et al. ............. 370/352 |
| 5,953,339 A | * | 9/1999 | Baldwin et al. ............ 370/397 |
| 6,097,951 A | * | 8/2000 | Ernam et al. ............... 455/433 |
| 6,101,395 A | | 8/2000 | Keshavachar et al. |
| 6,137,791 A | * | 10/2000 | Frid et al. ................... 370/352 |
| 6,167,040 A | * | 12/2000 | Haeggstrom ................ 370/352 |
| 6,347,085 B2 | * | 2/2002 | Kelly ......................... 370/352 |
| 6,356,545 B1 | * | 3/2002 | Vargo et al. ................ 370/355 |
| 6,426,955 B1 | * | 7/2002 | Gossett Dalton et al. ... 370/401 |
| 6,434,139 B1 | * | 8/2002 | Liu et al. .................... 370/352 |
| 6,445,697 B1 | * | 9/2002 | Fenton ....................... 370/357 |

FOREIGN PATENT DOCUMENTS

| | | |
|---|---|---|
| EP | 0 790 726 A2 | 8/1997 |
| EP | 0 907 295 A2 | 4/1999 |
| EP | 0 942 616 A1 | 9/1999 |
| WO | PCT/US94/08932 | 3/1995 |
| WO | WO 99/17506 | 4/1999 |
| WO | WO 00/24210 | 4/2000 |

* cited by examiner

Primary Examiner—Ricky Ngo
Assistant Examiner—Thomas E. Volper

(57) ABSTRACT

A communications system (36) and method (60, 80) of serving subscribers having an originating network (14) in communication with a terminating network (32) via a core network (24). The core network (24) includes a plurality of external gateways (40, 42, 44) each adapted to route calls therebetween, with each gateway (40, 42, 44) having at least one codec (50, 52, 54). The communications system (36) includes a network node (37) for processing call requests from the subscribers having a particular codec type, wherein available gateways (40, 42, 44) are ranked based on gateway codec availability, the core network (24) being adapted to route a call as a function of the ranking. The method includes the steps of the subscriber sending a call request and the subscriber's codec type to a first node (37) within the core network (24), the first node (37) selecting one of several external gateways (40, 42, 44) in the core network as a function of the codecs (50, 52, 54) determined to be available at the various gateways. The first node (37) may consult a second node (43) within the core network (24) for information indicative of available gateways in the core network (24).

19 Claims, 5 Drawing Sheets

120

| B NUMBER | CODEC REQUESTED |
|----------|-----------------|
| xx | xx |

| RANK | ZONE | SUBZONE | PATH | CODECS SUPPORTED |
|------|------|---------|------|------------------|
| 1 | $Z_1$ | $S_{Z1}$ | GATEWAY$_0$ (40) | TRA (50) |
| 2 | $Z_1$ | $S_{Z2}$ | GATEWAY$_1$ (42), NODE$_1$ | TRA (52) |
| 3 | $Z_2$ | $S_{Z1}$ | GATEWAY$_2$ (44) | TRA (54) |
| | | | | |

FIG. 6

ROUTING IN AN IP NETWORK BASED ON CODEC AVAILABILITY AND SUBSCRIBER PREFERENCE

TECHNICAL FIELD OF THE INVENTION

The present invention is generally related to communication networks including wireless telephony communication networks, communicating voice and data calls between an originating network and a terminating network, and more particularly to a communication network having dissimilar compression and decompression equipment, such as codecs, in the communication networks.

BACKGROUND OF THE INVENTION

Communication networks, including wireless communication networks, typically include an originating network, a terminating network, and a communication link exchanging voice and data between these networks. In the case of telephony networks, analog speech signals are typically digitized through digital sampling prior to transmission over the communication link and then converted back to analog at the terminating network. To increase the capacity of the communication network, these digitized voice calls routed over the communication link are typically compressed through the use of compression and decompression equipment, commonly referred to as codecs, vocoders or transcoders. Typically, a codec resides at both the originating end and at the terminating end of a call, whereby the digitized voice is compressed by an encoding algorithm in a forward direction, and decompressed by a decoding algorithm at the receiving end. Other codecs may be utilized at other nodes of the communication network for a single call or data transmission. The decompressed voice signal is ultimately converted back to voice through the use of a digital to analog (D/A) converter.

Decompressed digitized voice signals are typically routed over a communication link, such as a public switched telephone network (PSTN) in a pulse code modulated (PCM) format, typically at 64 kbps. A compressed signal may have a rate of between 6 and 20 kbps, for example, in a GSM (Global System for Mobile Communications.) The rate of the air interface is usually lower than 64 kbps. In cellular networks utilizing "voice over IP (Internet Protocol)," codecs may be positioned in gateways at the edge of the network, resulting in transmission at lower rates as far as possible

SUMMARY OF THE INVENTION

A number of different codec types exist today. For example, in GSM there are eight types available, with more being developed. Considering the wide range of codec variety, it is likely that a gateway may not support all codec types, and therefore there may be a mismatch between the codec in the mobile station and the gateway. A mismatch may result in a downgraded codec type in a gateway being selected, as compared to the mobile station codec type, causing poor speech quality. There is desired a communication system and method for effectively selecting a gateway when mismatches in codec types exist, improving signal quality.

The present invention achieves technical advantages as a system and method of selecting a gateway having a codec of the same type as the subscriber codec type or best adapted for the subscriber codec type, preventing unnecessary degradation of the voice signal. A communications system serving subscribers having an originating network in communication with a terminating network via a core network is disclosed. The core network includes a plurality of gateways, with each gateway adapted to route calls therebetween. Each gateway has at least one codec, and the communications system includes a network node for processing call requests from the subscribers having a particular codec type. The gateways are ranked based on the gateway codec availability, and the core network is adapted to route a voice call as a function of the gateway ranking.

Also disclosed is a method of communicating an encoded signal representative of speech across a core network between a subscriber served by an originating network including an encoder having an encoding algorithm and a terminating network. The core network includes a plurality of gateways, each having at least one resident codec. The method includes the steps of the subscriber sending a call request and the subscriber's codec type to a first node within the core network, and the first node selecting one of several gateways in the core network as a function of the codecs available at the various gateways of the network.

Further disclosed is a method of communicating an encoded signal representative of speech across a core network between a subscriber served by an originating network including an encoder having an encoding algorithm and a terminating network. The core network includes a plurality of gateways, each gateway having at least one resident codec. The method includes the steps of the subscriber sending a call request and the subscriber's codec type to a Mobile Switching Center (MSC) server within the core network. The MSC server consults a node within the core network for information indicative of available gateways in the core network. The MSC server selects one of several gateways in the core network as a function of the codecs available at the various gateways and the subscriber profile.

The present invention provides several advantages. First, the quality of a voice signal is improved by selecting a gateway having the best possible codec available for the mobile station codec. Second, a cost savings may be realized by transmitting a call for as long as possible over an IP network rather than over a traditional land-based network. Furthermore, subscribers who are willing to pay a premium for superior quality calls in accordance with the present invention are given the ability to do so. Also, the communications system efficiency is improved by having codec types at gateways matched, when possible, with the codec type of the subscribers. Some signaling in the communications system may be eliminated in accordance with the present invention, because gateway negotiation is decreased.

BRIEF DESCRIPTION OF THE DRAWINGS

In the drawings, which form an integral part of the specification and are to be read in conjunction therewith:

FIG. 5 is a preferred format of a codec request from a mobile station initiating a voice call; and FIG. 6 is a preferred format of a gateway selection list provided by the location server in accordance with the present invention.

Like numerals and symbols are employed in different figures to designate similar components in various views unless otherwise indicated.

DETAILED DESCRIPTION OF PREFERRED EMBODIMENTS

Figure 1:
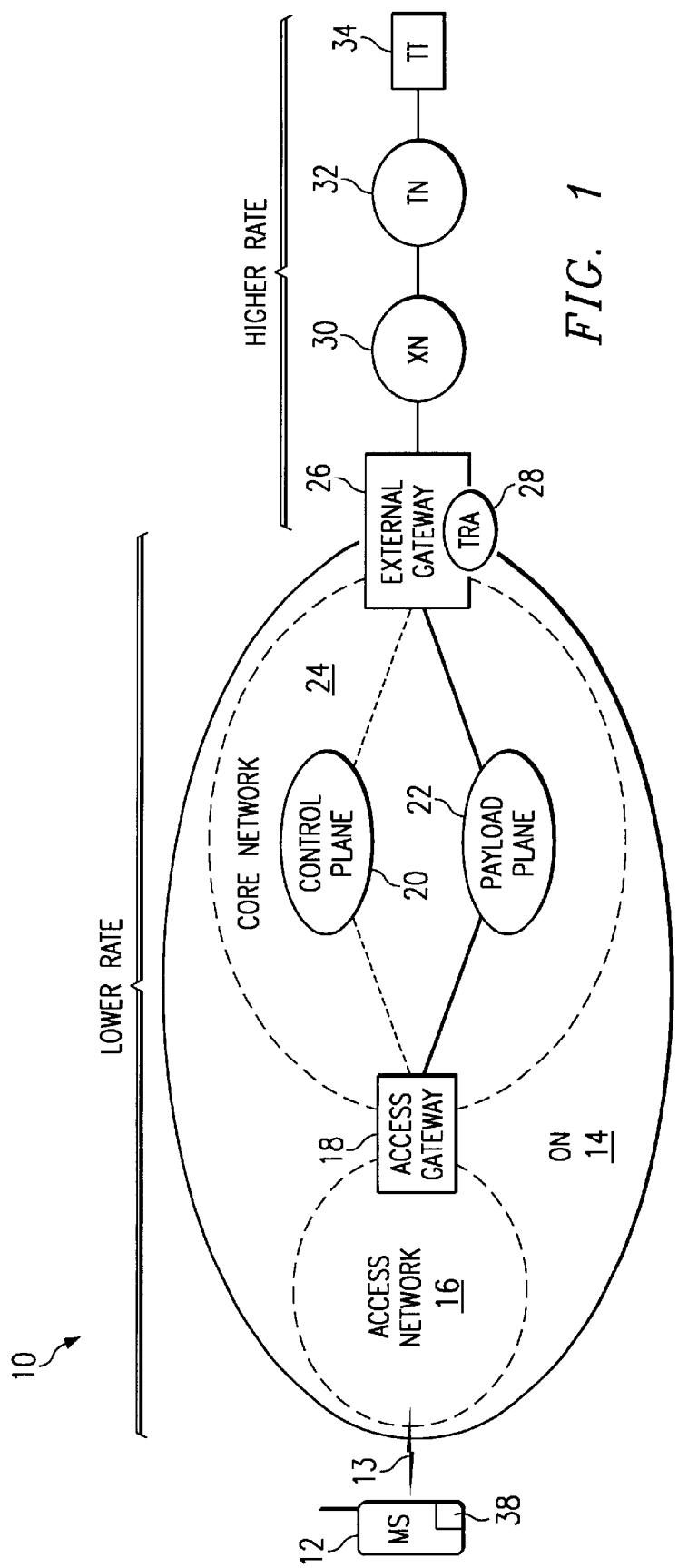
FIG. 1 is a block diagram of a communication network according to the present invention which may include a wireless communication network.

FIG. 1 illustrates a block diagram of a communication network 10 according to the preferred embodiment of the present invention, simplified for purposes of clarity. Communication network 10 preferably comprises a wireless telephony network that includes an originating terminal or mobile station (MS) 12 coupled by an RF link or air interface 13 to a servicing originating network (ON) 14. The originating terminal 12 is preferably a wireless communication device such as a wireless mobile station, but may also be a fixed station. The mobile station 12 may operate based on any number of communication standards including AMPS, TDMA, D-AMPS, GSM, and IS-95 protocols.

The originating network 14 comprises an access network 16 in communication with a core network 24. The access network 16 may include a plurality of base transceiver station (BTS) serviced by a plurality of base switching center (BSC) (not shown), although the access network 16 may vary as different infrastructures are available from different manufacturers and as a function of the communications standards and architecture implemented. The access network 16 is coupled to the core network 24 by an access gateway 18, as shown. The core network 24 includes a control plane 20 where the control signaling for voice calls takes place, and a payload plane 22 over which the voice calls are transmitted. An external gateway 26 having a transcoder 28 provides the link to a transit network (XN) 30. The transit network 30 typically comprises a public switched telephone network (PSTN), but may also comprise an optical network or Internet Protocol (IP) network. The transit network 30 interfaces and communicates electrical signals including digitized voice calls between originating network 14 and a terminating network 32. Terminating network 32 may be the same as, or different than, the originating network 14, and may comprise PSTN, AMPS, D-AMPS, TDMA, GSM and IS-95 networks. Terminating network (TN) 32 is coupled to and services via an RF link a terminating terminal (TT) 34, which may comprise a fixed or mobile station such as a wireless cellular or PCS subscriber.

The mobile station 12 and other nodes in the access network 16 may have a codec 38 for compressing and decompressing voice and data signals into a format capable of transmission across the network. Typically, a voice signal is compressed at the mobile station 12 by a codec 38 resident at the MS 12, to conserve bit rates on the air interface 13. The voice signal is transmitted through and over the originating network 14 at a lower compressed bit rate. The voice signal is decompressed by the transcoder 28 of the external gateway 26 of the core network 24 before being transmitted at a higher rate through the transit network 30 and terminating network 32 to the terminating terminal 34.

The codec 38 of the mobile station 12 compresses the voice and/or data signal with an encoding algorithm. Various categories of codecs are available in the art, such as half-rate (HR), full-rate (FR) or enhanced full-rate (EFR), with more advanced codecs designs currently in development. Within each category of codecs, there are several different types. Some examples of supported codecs include GSM EFR, GSM FR, GSM HR, and G.723. Full rate codecs may operate at 13 kbps, whereas half rate codecs may operate at 6.5 kbps, for example. Other codecs or vocoders are located at the BSC and other nodes in the communications system, as is known in the art.

A problem in communications systems of the prior art is that the external gateway 26 of the originating network 14 may not have a transcoder 28 available that is of the same type as the codec 38 of the mobile station 12 initiating the call. The system 10 negotiates a gateway 26 having a transcoder 28 that may be of a type downgraded from the mobile station 12, resulting in decreased signal quality. Furthermore, each codec routing a call in the communications network causes signal degradation. Thus, decreasing the number of codecs used will maintain the integrity of a speech signal. When the transit network 30 comprises an IP network, more gateways are added at the transition points between IP and non-IP networks. These additional gateways are needed for media mapping and transcoding functions between dissimilar network, for example, from G.711 to a low bit rate code like G.723.1 or back to GSM. Each transcoding further deteriorates speech quality.

Figure 2:
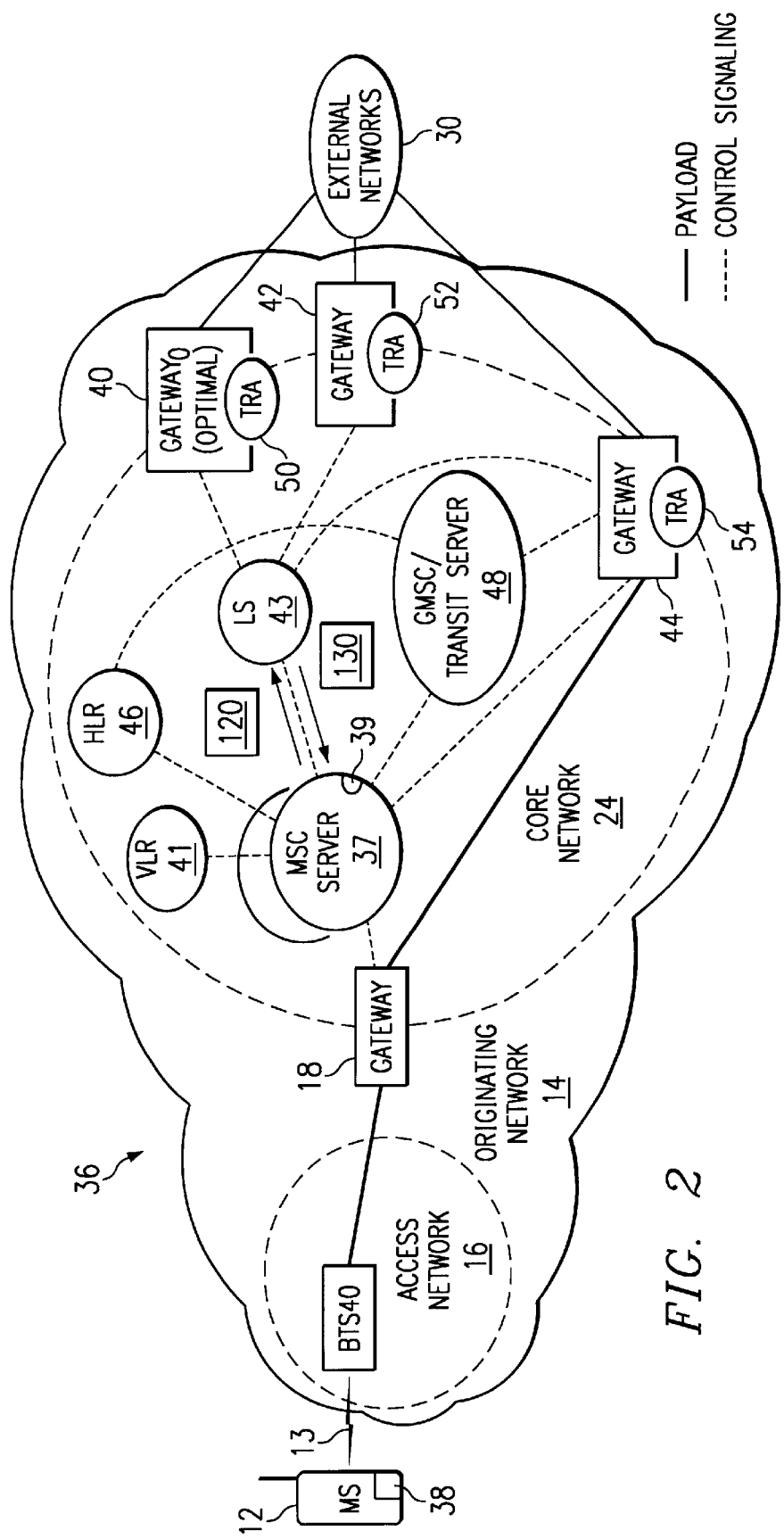
FIG. 2 is a block diagram of a preferred embodiment of the present invention whereby a subscriber with high priority requests the type of codec, and the location server within the core network ranks the possible gateways according to the codec requested and optimal routing to improve signal quality therebetween.

Referring to FIG. 2, therein is shown an expanded block diagram of the communication network 36 of the present invention. The originating network 14 is seen to include a base transceiver station (BTS) 40 serving via a radio frequency (RF) link or air interface 13 the originating mobile station (MS) 12 having a codec 38. Each BTS 40 services multiple mobile stations 12, although only one is shown for purposes of illustration and clarity. The terminating or external network 30 may operate according to the same operating protocol as originating network 14, i.e., both may be GSM networks, or, the terminating network 30 may be different from the originating network 14, i.e., the originating network 14 may be GSM and the terminating network 30 may be a PSTN or based on AMPS, D-AMPS, TDMA or IS-95 protocols. The transit or core network 24 in the preferred embodiment is preferably an Internet Protocol (IP) network, or "Voice over IP," but may also be an ATM, for example. The system of the present invention provides a cost savings by transmitting a telephony signal over the Internet for as long as possible, before the signal is transmitted out to external networks 30. Standards such as IETF propose an architecture similar to the one shown in FIG. 2, with an access gateway 18 facilitating connection of the radio access network 16 to the core network 16.

In the EP core network 24, there are typically thousands of gateways, represented for purposes of clarity by gateways 40, 42 and 44, that serve to interconnect to non-IP networks such as the PSTN. According to the present invention, a Location Server (LS) node 43 advantageously maintains a list of external gateways 40, 42, 44 in the core network 24 available for routing calls from access gateway 18 to external network 30. The LS node 43 is referenced by the control MSC server 37 to intelligently select one of the gateways 40, 42, 44 for routing a call. The access network 16 exchanges digitized voice data with nodes in the external networks 30 over the core network 24 through access gateway 18 and the best available gateway 40, 42 or 44. The voice data or payload is transferred through the core IP network 24 at a lower rate, preferably the same rate as the one used over the air interface 13.

The core network 24 includes a Home Location Register (HLR) 46 having subscriber information stored therein, HLR 46 being in communication with other nodes within the core network 24. The core network 24 also includes a visitor location register (VLR) 41, which includes and stores various information of the mobile stations 12 currently being served by the originating network 14. The MSC server 37 serves to control the routing of calls, while a GMSC/Transit server 48 actually performs the routing. Each external gateway 40, 42 and 44 includes one or more associated transcoders (TRAs) 50, 52, and 54, respectively, for decoding the encoded speech signal provided thereto. The payload, or voice call, is transferred between the access gateway 18 and external gateway (40, 42, 44) selected.

The present invention derives technical advantages by introducing a Routing Preference Indicator (RPI) in a call from MS 12 that allows the MSC server 37 or other node in the core network 16 to intelligently choose a gateway 40, 42, or 44 based on subscription preferences. The RPI may include a codec type (codec 38) request and optimal routing criteria, for example. The interrogation message 120 sent from the MSC server 37 to the LS 43 includes the codec type requested by MS 12 indicated in the RPI and the B number associated with the call, for example. The LS 43 responsively processes the codec request, using resident optimal routing criteria to scan a list of compatible gateways and provide a list 130 of suitable gateways back to the MSC server 37. A function or module 39 in the MSC server 37 uses this list 130 to determine which gateway to route the call to. For example, the MS 12 may have a FR codec 38, and the subscriber preference in the RPI may indicate to search for a gateway, 40 having a FR transcoder 50 so that the voice signal is not downgraded.

Figure 3:
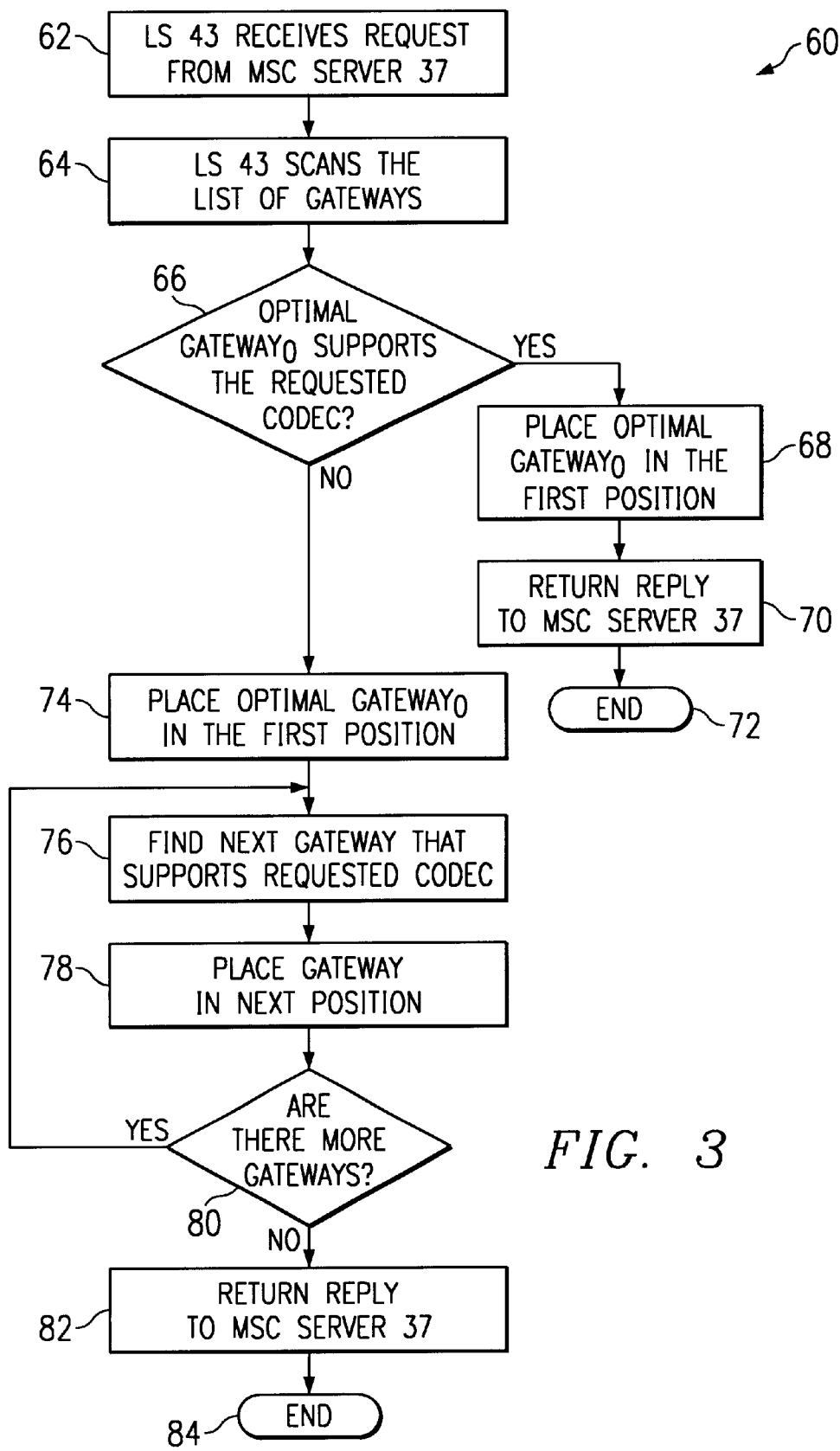
FIG. 3 is a flow chart indicating the location server process.
Figure 4:
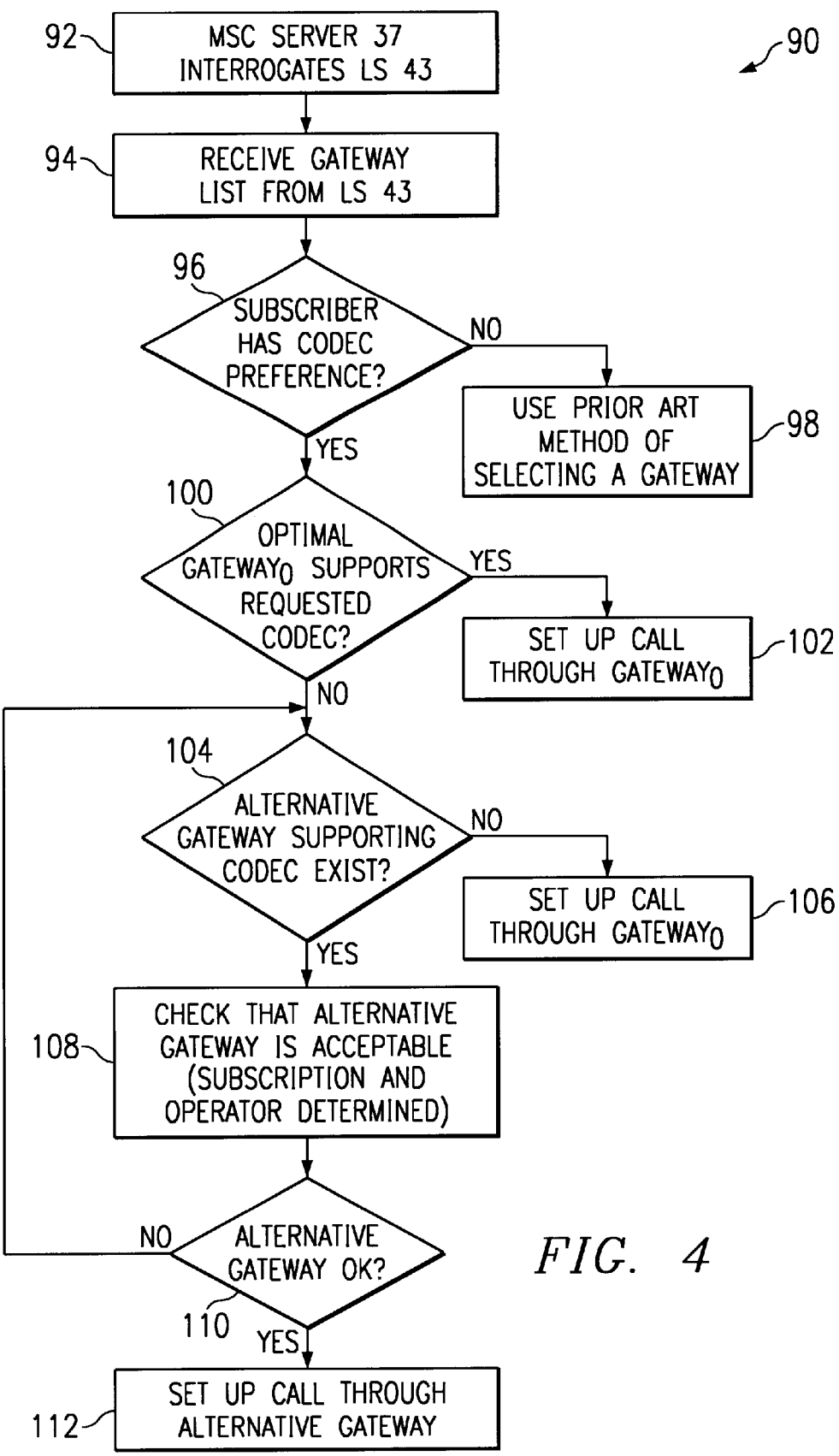
FIG. 4 is a flow chart outlining the MSC server process.

FIGS. 3 and 4 illustrate flow charts for preferred processes 60 and 90 for the location server 43 and MSC server 37, respectively. When a call is initiated by MS 12, the MSC server 37 accesses a function or module 39 that sends an interrogation message 120 to the location server 43 (step 92 of FIG. 4). The interrogation message 120 contains the MS 12 RPI, which includes the codec type and subscriber profile. The LS 43 receives the request from the MSC server 37 (step 62 of FIG. 3) and scans a list of available external gateways (step 64), the list being located at and maintained by the LS 43. In accordance with the present invention, the LS 43 queries whether there is an optimal gateway, available that supports the requested codec type (step 66). If there is, the LS 43 places the optimal gateway$_0$ having the requested codec type in the first position on the list 130 (step 68), and returns the reply 130 to the MSC server 37 (step 70). If the optimal gateway, does not support the requested codec, the LS 43 places the gateways$_0$, although not having the requested codec type but otherwise optimal, in the first position of the list 130 (step 74). Then, the LS 43 finds the next gateway that supports the requested codec type (76) and places that gateway in the next position of the list 130 (step 78). Steps 76 and 78 are repeated until there are no more gateways available (step 80). The LS 43 then returns the reply in the form of a list 130, for example, to the MSC server 37 (step 82).

Referring next to FIG. 4, the MSC server 37 receives the list 130 from the LS 43 (step 94). A module 39 in the MSC server 37 processes the information by querying whether the subscriber has a codec preference (step 96), and if not, the MSC server 37 uses prior art method of selecting an external gateway (40, 42 and 44) (step 98). If the subscriber does have a codec preference, the MSC server 37 examines the list 130 to determine whether there is an optimal gateway$_0$ that supports the requested codec (step 100). If there is, the call is set up through the optimal gateway$_0$ (step 102). If gateway$_0$ does not support the requested codec, the MSC server 37 determines if there is an alternative gateway available that supports the codec request (step 104). If not, the call is set up through gateway$_0$ and the voice signal is downgraded to accommodate the codec at gateway$_0$. If there is an alternative gateway available that supports the codec request, the MSC server 37 checks that the alternative gateway is acceptable (step 108). The result of this check is typically subscription and operator determined. If the selected alternative gateway is acceptable (step 110, the call is set up through the alternative gateway (step 112) such as gateway 42. If unacceptable, steps 104, 108 and 110 are repeated until an acceptable alternative gateway is found.

It is seen that with the present invention, subscribers willing to pay an additional amount to ensure better speech quality, or conversely, incur a cost savings on their mobile service to receive lower speech quality, are provided the option to be deemed a high or low priority subscriber. If the subscriber is not determined to be high priority subscriber, the MSC server 37 selects one of gateways 40, 42 or 44 in accordance with methods of the prior art.

FIG. 5 illustrates a possible format for the interrogation message 120 sent from the MSC server 37 to the LS 43, with at least the codec type requested and B number provided to the LS 43. FIG. 5 shows a preferred format for the list 130 generated by the LS 43 and returned to the MSC server 37. The ranking of the possible pathways may include not only the gateway(s) or paths chosen, but also the nodes between the end destination and the chosen gateway(s). Furthermore, the physical geographical area of the available gateways may be divided into zones, and further into subzones, to allow the MSC server 37 to select a gateway in closest proximity to the end destination. If the function or module 56 finds two or more gateways within the same zone, the best codec can be chosen within the same zone. This feature allows a call to be placed over the core IP network 16 for as long as possible, to decrease transmission costs. The list also contains the codec type supported at each gateway.

The novel communications system and method of communicating disclosed herein provides several advantages. First, the quality of a voice signal is improved by the use of the present invention because a gateway having the best possible codec available, compared to the mobile station codec, is selected. Second, a cost savings is realized by transmitting a call for as long as possible over an IP network rather than over a traditional land-based network. Furthermore, subscribers who are willing to pay a premium for superior quality calls in accordance with the present invention are given the ability to do so. Also, the communications system efficiency is improved by having codec types at gateways matched, when possible, with the codec type of the subscribers. Some signaling in the system may be eliminated in accordance with the present invention, because gateway negotiation is decreased.

Though the invention has been described with respect to a specific preferred embodiment, many variations and modifications will become apparent to those skilled in the art upon reading the present application. For example, while the function or module 39 is shown to reside in the MSC server 37 of the core network 16, this function or module 39 may reside in another node of the network 16, such as access gateway 18. It is therefore the intention that the appended claims be interpreted as broadly as possible in view of the prior art to include all such variations and modifications.

What is claimed is:

1. A communications system having an originating network in communication with a terminating network via a core network, said core network comprising more than one gateway, each said gateway having at least one codec, said communications system comprising:

a first node in said originating network for sending a call request from a mobile station, wherein said request includes a codec type of said mobile station;

a second node in said core network for scanning a list of gateways, said list being maintained in said second node, utilizing optimal routing criteria to determine whether there Is an optimal gateway that supports said mobile station's codec type;

means for placing said optimal gateway in the first position of a list of suitable gateways;

means for selecting an alternative gateway that supports the requested codec type and then adding said alternative gateway to said list of suitable gateways in the second position and repeating the selection step until all suitable gateways in the core network are included in said list of suitable gateways;

transmission means for sending said list of suitable gateways to said first node;

said first node for determining whether said mobile station has a codec preference; and means associated with said first node for comparing said mobile station codec preference with said list of suitable gateways and determining the gateway for receiving said mobile station call according to the rank on said list of suitable gateways the compatibility of said gateway codec and said mobile station codec type, and for selecting said optimal gateway absent a compatible codec in either said optimal gateway or any one of said alternative gateways.

2. The communications system according to claim 1 wherein said second node also ranks said available gateways as a function of said subscriber codec type.

3. The communications system according to claim 1 wherein said core network includes an MSC server in communication with said gateways and said second node comprises a location server.

4. The communications system according to claim 3 wherein said core network comprises an Internet Protocol (IP) network.

5. The communications system according to claim 3 wherein said optimal ranked gateway has an available codec of the same type as the mobile station codec type.

6. The communications system according to claim 3 wherein the location server comprises a mechanism adapted to rank gateways supporting the mobile station codec type according to the mobile station's physical location in the core network with respect to the MSC server.

7. The communications system according to claim 6 wherein said mobile station's physical location is defined by regions.

8. The communications system according to claim 7 wherein said regions include a country block, a single country, and part of a country.

9. The communications system according to claim 7 wherein a selected gateway is located in the same region as the MSC server.

10. The communications system according to claim 1 wherein said terminating network comprises a PSTN.

11. A method of communicating an encoded speech signal between a mobile station, served by an originating network across a core network comprising more than one gateway each said gateway having at least one codec, and a terminating network said method comprising the steps of:

receiving a call request from a mobile station via a first node in said originating network, wherein said request includes a codec type of said mobile station;

scanning a list of gateways, said list being maintained In a second node in said core network, utilizing optimal routing criteria to determine whether there is an optimal gateway available that supports said mobile station's codec type; placing said optimal gateway in the first position on a list of suitable gateways;

selecting an alternative gateway that supports the requested codec type and then adding said alternative gateway to said list of suitable gateways In the second position and repeating the selection step until all suitable gateways in the core network are included in said list of suitable gateways;

sending said list of suitable gateways to said first node;

determining whether said mobile station has a codec preference;

responsive to the determination of said codec preference, said first node determining the gateway for receiving said mobile station call by selecting the highest ranked gateway with codec most compatible with the mobile station codec; and absent a compatible codec in either said optimal gateway or any one of said alternative gateways, selecting said optimal gateway.

12. The method according to claim 11 wherein said first node comprises a Mobile Switching Center (MSC) server.

13. The method according to claim 12 wherein said MSC server consults said second node within said core network for information indicative of available said gateways in the core network.

14. The method according to claim 13 wherein said second node comprises a Location Server, said information of available gateways being ranked by a routing preference Indicator, further comprising the steps of:

sending an Interrogation message from said MSC server to said Location Server, said interrogation message indicating a codes type of said mobile station; and receiving said information of available gateways and codec types by said MSC server from said Location Server.

15. The method according to claim 14 wherein said Location Server provides pairs of gateway-PSTN/Transit Server identities to said MSC server.

16. The method according to claim 14 wherein said Location Server comprises a table having gateways grouped In order according to supported codecs and related to bit rate.

17. The method according to claim 14 wherein said Location Server ranks gateways supporting the identified mobile station codec according to the physical location of the gateways within the core network with respect to the MSC server.

18. The method according to claim 11 wherein said communication link comprises a PSTN.

19. The method according to claim 11 wherein said core network comprises an Internet Protocol (IP) network.

* * * * *